J. R. SCARBOROUGH.
Broadcast Seeders.
No. 145,018.  Patented Nov. 25, 1873.
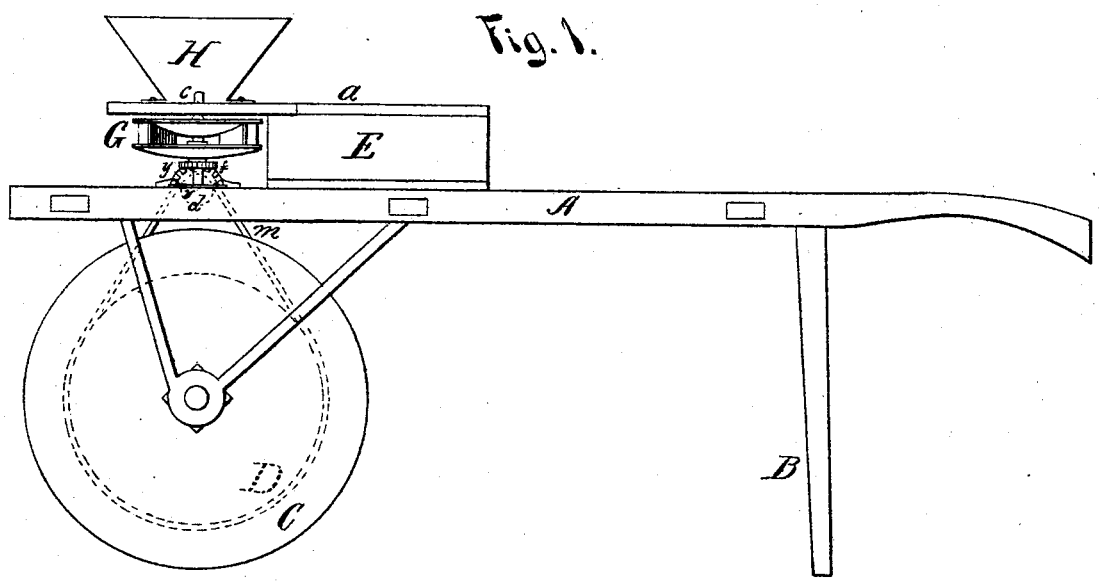
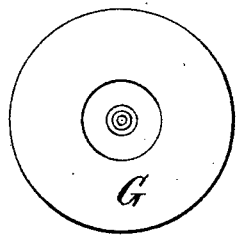
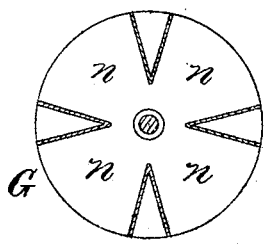
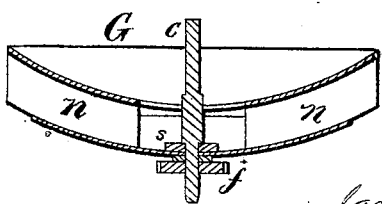
Witnesses.
George E. Upham,
Emory H. Bates.
Inventor.
James R. Scarborough,
Chipman Hosmer & Co,
Attys.

UNITED STATES PATENT OFFICE.

JAMES R. SCARBOROUGH, OF MILBURN, KENTUCKY.

IMPROVEMENT IN BROADCAST SEEDERS.

Specification forming part of Letters Patent No. 145,018, dated November 25, 1873; application filed July 12, 1873.

*To all whom it may concern:*

Be it known that I, JAMES R. SCARBOROUGH, of Milburn, in the county of Ballard and State of Kentucky, have invented a new and valuable Improvement in Hand Broadcast Seeders; and I do hereby declare that the following is a full, clear, and exact description of the construction and operation of the same, reference being had to the annexed drawings making a part of this specification, and to the letters and figures of reference marked thereon.

Figure 1 of the drawings is a representation of a side view of my hand broadcast seeder. Figs. 2, 3, and 4 are views of the scatterer.

My invention relates to broadcast seed-sowers; and consists in the novel construction and arrangement of the rotating scatterer, as hereinafter described and claimed.

A of the drawings represents a frame resembling a wheelbarrow in outline, but wider at its rear end than at its front, so as to form a species of triangle. Of this frame, B represents the legs, and C the wheel, having an auxiliary band-wheel, D. The letter E represents a triangular block arranged upon the frame-bed, the base of which is turned rearward. A plank, $a$, extends forward from the top of this block, and serves as a support and bearing for the operating shaft next mentioned. The letter $c$ represents a shaft, having its upper bearing in the plank $a$, and its lower bearing or point in or upon the frame of the carriage. On this shaft I arrange the pinion $f$ and the scatterer G, in the manner shown on Figs. 1 and 4. The scatterer G is constructed with two concave disks, separated by four, more or less, of triangular vertical compartments, marked $n$. I also arrange a washer, $s$, around the shaft $c$, as shown on Fig. 4. The letter $v$ represents a horizontal shaft arranged in suitable bearings upon the frame-bed, and $y$ is a vertical pinion affixed to said shaft in such manner as to engage with the pinion $f$. The letter $m$ represents the operating band arranged upon the band-wheel D, and passing over the drum $d$ upon the shaft $v$. The letter H represents the seed-hopper, the seed from which passes through small openings in the plank $a$, upon which it is arranged. After passing from the hopper, the seed falls first upon the upper concave disk. This disk does not clasp the vertical shaft tightly, but sufficient space is left between them to permit the seed to pass downward upon the lower disk of the scatterer. The rapidity with which the seed passes from the hopper to the lower disk of the scatterer is necessarily regulated by the size of the openings through the plank $a$ and the space between the upper disk and perpendicular shaft. Great care should therefore be taken to adapt these openings to the necessities of the case.

The carriage is propelled forward like an ordinary wheelbarrow, and thereby the operating machinery is set in motion, causing the scatterer to rotate with great rapidity. Now, as the seed falls on the lower disk it is hurled with considerable force against the triangular partitions $n$, and from thence outward to the air on all sides. The seed thrown rearward from the scatterer strikes the triangular block E, from the sides of which it glides outward and falls on the earth.

These angular divisions do not extend to the center of the disks, but end at the periphery of the opening in the upper disk, thereby forming a basin or box for the accumulation of seed prior to their expulsion therefrom, and in a great measure regulating the distributing process.

I am well aware that rotating seed-scatterers are not new, therefore I do not claim such invention broadly.

What I claim as new, and desire to secure by Letters Patent, is—

In a broadcast seeder, the scatterer G, constructed with two concave disks of equal size, arranged one above the other, and separated by the radiating angular partition-plates $n$, their inner acute angles meeting the margin of the opening in the upper disk, substantially as shown and described.

In testimony that I claim the above I have hereunto subscribed my name in the presence of two witnesses.

JAMES RIGGS SCARBOROUGH.

Witnesses:
 J. R. BLOUNT,
 B. A. HOWARD.